United States Patent
Nagayama et al.

(10) Patent No.: US 6,991,752 B2
(45) Date of Patent: Jan. 31, 2006

(54) POSITIVE ELECTRODE ACTIVE MATERIAL FOR NON-AQUEOUS ELECTROLYTE SECONDARY CELL AND CELL USING THE SAME

(75) Inventors: Masatoshi Nagayama, Hirakata (JP); Hiroshi Yoshizawa, Hirakata (JP); Shinji Arimoto, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 584 days.

(21) Appl. No.: 10/182,125

(22) PCT Filed: Dec. 3, 2001

(86) PCT No.: PCT/JP01/10559

§ 371 (c)(1),
(2), (4) Date: Jul. 26, 2002

(87) PCT Pub. No.: WO02/054511

PCT Pub. Date: Jul. 11, 2002

(65) Prior Publication Data

US 2003/0013017 A1    Jan. 16, 2003

(30) Foreign Application Priority Data

Dec. 27, 2000 (JP) .............................. 2000-397666

(51) Int. Cl.
H01B 1/02   (2006.01)

(52) U.S. Cl. ............................. 252/521.2; 429/231.3; 429/231.95

(58) Field of Classification Search ............. 429/218.1, 429/231.1, 231.3, 231.9, 231.95; 423/579, 423/592.1, 593.1, 594.5, 594.6, 594.15, 594.16, 423/635, 641, 594.19; 252/521.2, 518.1, 252/519.1

See application file for complete search history.

(56) References Cited

FOREIGN PATENT DOCUMENTS

| JP | 4-171659 | 6/1992 |
|----|----------|--------|
| JP | 5-242891 | 9/1993 |
| JP | 6-168722 | 6/1994 |
| JP | 7-226201 | 8/1995 |
| JP | 8-190907 | 7/1996 |
| JP | 9-274917 | 10/1997 |
| JP | 10-241691 | 9/1998 |
| JP | 11-7958 | 1/1999 |
| JP | 2000-123834 | 4/2000 |

OTHER PUBLICATIONS webmineral.com/help/crystalsystem.shtml.*

* cited by examiner

*Primary Examiner*—Patrick Joseph Ryan
*Assistant Examiner*—Melissa Austin
(74) *Attorney, Agent, or Firm*—McDermott Will & Emery LLP

(57) ABSTRACT

There is provided a positive electrode active material for a non-aqueous electrolyte secondary battery, comprising a composite oxide represented by the general formula (1): $(Li_{1-x}M_x)_a(Co_{1-y}M_y)_bO_c$ where lithium and cobalt are partly replaced with element M in the crystal structure of $LiCoO_c$, wherein element M is at least one selected from the group consisting of Al, Cu, Zn, Mg, Ca, Ba and Sr, and $0.02 \leq x+y \leq 0.15$, $0.90 \leq a/b \leq 1.10$, and $1.8 \leq c \leq 2.2$ are satisfied.

8 Claims, 1 Drawing Sheet

POSITIVE ELECTRODE ACTIVE MATERIAL FOR NON-AQUEOUS ELECTROLYTE SECONDARY CELL AND CELL USING THE SAME

TECHNICAL FIELD

The present invention relates to a positive electrode active material for a non-aqueous electrolyte secondary battery and a non-aqueous electrolyte secondary battery for use in, for example, personal digital assistants, portable electronic appliances and home-use power storage devices as well as two-wheeled motor vehicles, electric vehicles and hybrid electric vehicles, each of which employs a motor as the power source.

BACKGROUND ART

Non-aqueous electrolyte secondary batteries, which have been recently used in various fields, have high electromotive force and high energy density. As the positive electrode active material for non-aqueous electrolyte secondary batteries, lithium cobaltate ($LiCoO_2$) is mainly used. This substance has a high oxidation-reduction potential of 4 V or higher with respect to lithium.

The above positive electrode active material repeatedly expands and contracts during charge/discharge. In such an occasion, the positive electrode active material undergoes distortion, structural destruction and pulverization, resulting in a problem of a decrease in the discharge capacity during charge/discharge cycles. In order to solve this problem, attempts have been made to stabilize the crystal lattice to improve the cycle characteristic by partly replacing cobalt with a different element.

For example, Japanese Unexamined Patent Publication Nos. hei 5-242891, hei 6-168722 and hei 11-7958 describe that partly replacing cobalt in the active material with a different element improves the cycle characteristic and safety of the battery. However, although the cycle characteristic is improved when cobalt is partly replaced with a different element, the battery thickness gradually increases owing to repeated charge/discharge cycles. In the case of square batteries or laminated batteries, the problem of an increase in battery thickness needs to be addressed because the cases thereof have poor strength.

On the other hand, Japanese Unexamined Patent Publication No. hei 7-226201 describes an effect of partly replacing lithium in the active material with a different element. However, also in this case, the battery thickness gradually increases owing to repeated charge/discharge cycles.

Although the cause of an increase in battery thickness is unknown, it is presumably attributed to the weak interaction in the crystal structure of the active material between a metal oxide layer comprising the aforementioned different element and cobalt and a layer comprising lithium. It is considered that repeated charge/discharge cycles increase distortion between these layers, resulting in an expansion of the crystal lattice.

As described above, since conventional positive electrode active materials undergo distortion, structural destruction and pulverization due to repeated charge/discharge cycles, they have a disadvantage of increasing the battery thickness and decreasing the discharge capacity. As a result, although the batteries have high thermal stability during the initial charge/discharge period, they have another disadvantage that the structure of the positive electrode active materials become unstable to cause an insufficient thermal stability after repeated charge/discharge cycles.

DISCLOSURE OF INVENTION

The present invention solves the foregoing problems and it has an object of improving a positive electrode active material to suppress an increase in battery thickness due to repeated charge/discharge cycles, thereby retaining the discharge capacity and thermal stability of a battery.

More specifically, the present invention relates to a positive electrode active material for a non-aqueous electrolyte secondary battery, comprising a composite oxide represented by the general formula (1):

$$(Li_{1-x}M_x)_a(Co_{1-y}M_y)_bO_c \qquad (1)$$

where lithium and cobalt are partly replaced with element M in the crystal structure of $LiCoO_c$, wherein element M is at least one selected from the group consisting of Al, Cu, Zn, Mg, Ca, Ba and Sr, and $0.02 \leq x+y \leq 0.15$, $0.90 \leq a/b \leq 1.10$, and $1.8 \leq c \leq 2.2$ are satisfied.

It is preferable that the composite oxide has an $\alpha$-$NaFeO_2$ type layer structure belonging to space group R3-m.

It is preferable that the composite oxide has a mean particle diameter of 5 to 20 $\mu$m.

It is preferable that the composite oxide has a specific surface area of 0.3 to 1.2 $m^2/g$.

The present invention also relates to a non-aqueous electrolyte secondary battery comprising: a positive electrode comprising the above-described positive electrode active material; a negative electrode comprising metallic lithium or a material capable of absorbing and desorbing lithium; and a non-aqueous electrolyte.

BEST MODE FOR CARRYING OUT THE INVENTION

Figure 1:
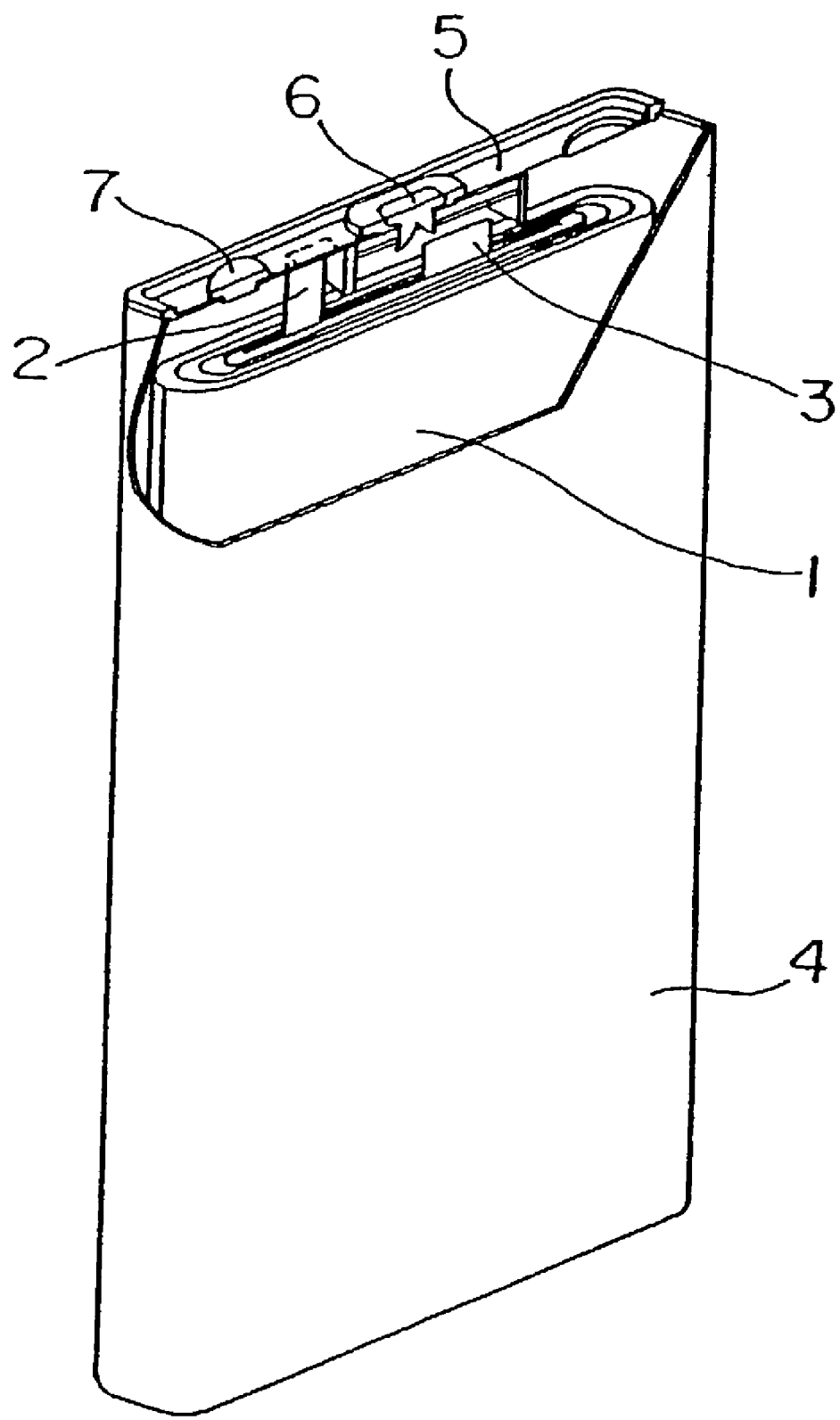
FIG. 1 is a partially cutaway oblique view of a square battery of examples in accordance with the present invention.

The positive electrode active material for a non-aqueous electrolyte secondary battery in accordance with the present invention comprises a composite oxide represented by the general formula (1):

$$(Li_{1-x}M_x)_a(Co_{1-y}M_y)_bO_c \qquad (1)$$

where lithium and cobalt are partly replaced with element M in the crystal structure of $LiCoO_c$, wherein element M is at least one selected from the group consisting of Al, Cu, Zn, Mg, Ca, Ba and Sr, and $0.02 \leq x+y \leq 0.15$, $0.90 \leq a/b \leq 1.10$, and $1.8 \leq c \leq 2.2$ are satisfied.

Partly replacing lithium and cobalt with element M strengthens the binding force between a metal oxide layer comprising element M and cobalt and a layer comprising element M and lithium. As a result, an increase in the distortion between the layers and the expansion of the crystal lattice due to repeated charge/discharge cycles are suppressed. With the use of this active material, it is possible to produce a battery with high thermal stability of which increase in thickness due to repeated charge/discharge cycles is suppressed to improve the cycle life.

It should be noted that since the above-mentioned conventional positive electrode active materials are produced by replacing either only one of lithium and cobalt in $LiCoO_2$ with a different element, they are considered to be incapable of suppressing an increase in the distortion between the layers constituting the crystal and the expansion of the crystal lattice.

When x+y, which indicates the amount of element M, is more than 0.15 in the general formula (1), the structure of the positive electrode active material is further stabilized, whereas a decrease in the battery capacity becomes greater. When x+y is less than 0.02, the structure of the positive electrode active material is not able to be stabilized. Further, from the viewpoint of stabilizing the active material structure while retaining the battery capacity, it is preferable that $0.002 \leq x \leq 0.08$, and $0.018 \leq y \leq 0.148$. When x is either too small or too large, it is impossible to sufficiently strengthen the binding force between the oxide layer comprising element M and cobalt and the layer comprising element M and lithium.

Next, descriptions are made on the method of synthesizing a composite oxide represented by the formula (1).

Firstly, a solution containing the starting materials of cobalt and element M is prepared. The molar ratio of Co and M contained in the solution is set at 1-y:y. While the materials described below may be used as the starting materials of cobalt and element M without any limitation, sulfate is preferably used herein. An alkaline aqueous solution is continuously added dropwise to this solution, while controlling the pH thereof, to precipitate a coprecipitate (hereinafter, referred to as "precursor") comprising a cobalt hydroxide and a hydroxide of element M.

Next, the starting materials of lithium and element M are added with the precursor such that the molar ratio of Li and M is 1-x:x. Herein, the total number of moles of Co and M contained in the precursor and the total number of moles of Li and M contained in the starting materials are set to be substantially equal. Subsequently, the obtained mixture is baked to produce a desired composite oxide.

The resultant composite oxide has a structure in which lithium and cobalt are partly replaced with element M in the crystal structure of $LiCoO_c$, for the following reasons.

Firstly, in the hydroxide synthesized as the precursor, cobalt and element M have a hexacoordinate structure having hydroxide groups as ligand. Accordingly, these hydroxides are entirely placed in the sites of cobalt of $LiCoO_2$, reflected by the hexacoordinate structure.

Secondly, since the total number of moles of Li and M contained in the starting materials to be mixed with the precursor is set to be substantially equal to the total number of moles of cobalt and M contained in the precursor, the element M added later was entirely placed in the sites of lithium of $LiCoO_2$.

These facts can be confirmed by Rietveld analysis of the crystal structure of the resultant composite oxide. It is also possible to confirm that the resultant composite oxide has an $\alpha$—$NaFeO_2$ type layer structure belonging to space group R3-m, as in the case of $LiCoO_2$.

It is preferable that the composite oxide has a diameter of 5 to 20 $\mu$m, from the viewpoint of stabilizing the electrode reaction. When the mean particle diameter is less than 5 $\mu$m, the amount of gas generation on the positive electrode is increased to deteriorate the cycle characteristic. When the mean particle diameter is more than 20 $\mu$m, the performance at high load and battery capacity are reduced.

It is preferable that the composite oxide has a specific surface area of 0.3 to 1.2 $m^2/g$, from the viewpoint of stabilizing the electrode reaction. When the specific surface area is less than 0.3 $m^2/g$, the performance at high load and battery capacity are decreased, and when it is more than 1.2 $m^2/g$, the amount of gas generation on the positive electrode is increased to deteriorate the cycle characteristic.

As the starting material of cobalt used for synthesizing the composite oxide, basic cobalt carbonate, cobalt hydroxide, cobalt nitrate, cobalt sulfate, cobalt oxide, cobalt fluoride or the like can be used.

As the starting material of element M used for synthesizing the composite oxide, the following can be used.

When element M is Al, aluminium hydroxide, aluminium nitrate, aluminium oxide, aluminium fluoride, aluminium sulfate or the like can be used.

When element M is Cu, copper oxide, copper sulfate, copper carbonate, copper acetate, copper oxalate, copper chloride, copper sulfide or the like can be used.

When element M is Zn, zinc oxide, zinc acetate, zinc chloride, zinc fluoride, zinc sulfate, zinc nitrate, zinc sulfide or the like can be used.

When element M is Mg, magnesium oxide, basic magnesium carbonate, magnesium chloride, magnesium fluoride, magnesium nitrate, magnesium sulfate, magnesium acetate, magnesium oxalate, magnesium sulfide, magnesium hydroxide or the like can be used.

When element M is Ca, calcium oxide, calcium chloride, calcium carbonate, calcium fluoride, calcium nitrate, calcium sulfate, calcium sulfide, calcium hydroxide or the like can be used.

When element M is Ba, barium oxide, barium chloride, barium carbonate, barium fluoride, barium oxalate, barium nitrate, barium sulfate, barium sulfide or the like can be used.

When element M is Sr, strontium oxide, strontium chloride, strontium carbonate, strontium oxalate, strontium fluoride, strontium sulfate, strontium nitrate, strontium hydroxide, strontium sulfide or the like can be used.

As the starting material of lithium used for synthesizing the composite oxide, lithium carbonate, lithium hydroxide, lithium nitrate, lithium sulfate, lithium oxide or the like can be used.

Since its increase in thickness due to repeated charge/discharge cycles is suppressed, a non-aqueous electrolyte secondary battery comprising: a positive electrode comprising the above-described positive electrode active material; a negative electrode; a non-aqueous electrolyte is capable of retaining the discharge capacity and thermal stability over a long period.

As the negative electrode material, metallic lithium or a material capable of absorbing and desorbing lithium is employed. Examples of a material capable of absorbing and desorbing lithium include: alloy materials; thermally decomposed carbons; cokes such as pitch coke, needle coke and petroleum coke; graphites; glassy carbons; baked organic polymer compounds produced by baking phenolic resin, furan resin or the like at a suitable temperature; carbon fibers; activated carbons; polymers such as polyacetylene, polypyrrole and polyacene; lithium-containing transition metal oxides such as $Li_4Mn_5O_{12}$; and lithium-containing transition metal sulfides such as $TiS_2$.

The non-aqueous electrolyte is prepared by dissolving a lithium salt in a non-aqueous solvent.

As the non-aqueous solvent, any known materials and additives can be employed. Particularly preferred are: a mixed solvent of a cyclic carbonate such as ethylene carbonate, propylene carbonate, butylene carbonate or vinylene carbonate and a non-cyclic carbonate such as dimethyl carbonate, diethyl carbonate, ethyl methyl carbonate or dipropyl carbonate; and a mixed solvent of a cyclic carbonate, a non-cyclic carbonate and an aliphatic carboxylic acid ester such as methyl formate, methyl acetate, methyl propionate or ethyl propionate, and the like.

As the lithium salt, $LiClO_4$, $LiAsF_6$, $LiPF_6$, $LiBF_4$, $LiCF_3SO_3$, $LiN(CF_3SO_2)(C_2F_5SO_2)$, $LiN(CF_3SO_2)_2$, $LiN(C_2F_5SO_2)_2$, $LiN(CF_3SO_2)(C_4F_9SO_2)$ or the like can be used. These may be used alone or in combination of two or more.

The positive electrode can be produced, for example, by preparing a positive electrode mixture comprising a positive electrode active material, binder and conductive material, and applying the same to an current collector. The negative electrode can be produced, for example, by preparing a negative electrode mixture comprising a negative electrode material and binder, and applying the same to a current collector.

As the binder for the negative electrode, either one of thermoplastic resin and thermosetting resin may be employed. These materials may be used alone or in combination. Particularly preferred are: styrene butadiene rubber, polyvinylidene fluoride, an ethylene-acrylic acid copolymer or an Na ion-cross-linked copolymer thereof, an ethylene-methacrylic acid copolymer or an Na ion-cross-linked copolymer thereof, an ethylene-methyl acrylate copolymer or an Na ion-cross-linked copolymer thereof, an ethylene-methyl methacrylate copolymer or an Na ion-cross-linked copolymer thereof, and the like.

As the conductive agent for the negative electrode, artificial graphite, acetylene black, carbon fiber or the like can be used. The amount of the conductive agent is preferably 1 to 50 wt % with respect to the negative electrode material, and more preferably 1 to 30 wt %. In the case where the negative electrode material itself has electronic conductivity, the conductive agent may not be added.

The current collector for the negative electrode is preferably made of copper or copper alloy. The surface of these materials may be oxidized for use. Additionally, it is preferable to form asperities on the surface of the current collector. As the current collector, metallic foil, film, sheet or net; punched metal; metal lath; porous material, foamed material, woven fabric or nonwoven fabric each having conductivity, or the like may be used. The thickness of the current collector is 1 to 500 $\mu$m, although not specifically limited thereto.

As the conductive agent for the positive electrode, artificial graphite, acetylene black or the like can be employed. The amount of the conductive agent is preferably 1 to 50 wt % with respect to the positive electrode active material, and more preferably 1 to 30 wt %, although not specifically limited thereto. In the case of carbon or graphite, it is most preferably 2 to 15 wt %.

As the binder for the positive electrode, either one of thermoplastic resin and thermosetting resin can be used. These materials can be used alone or in combination. Particularly preferred materials are polyvinylidene fluoride and polytetrafluoroethylene.

The current collector for the positive electrode is preferably made of aluminum or aluminum alloy. The surface of these materials may be oxidized for use. Additionally, it is preferable to form asperities on the surface of the current collector. As the current collector, metallic foil, film, sheet or net; punched metal; metal lath; porous material, foamed material, woven fabric or nonwoven fabric each having conductivity, or the like may be used. The thickness of the current collector is 1 to 500 $\mu$m, although not specifically limited thereto.

In the electrode mixture, a filler or other various additives can be contained, in addition to the conductive agent and the binder. The amount of the filler is preferably 0 to 30 wt % in the electrode mixture, although not specifically limited thereto.

As the separator used in the present invention, microporous thin film or nonwoven fabric each having high ionic permeability, a predetermined mechanical strength and insulating property is preferably employed. It is preferable that the separator has the function to increase the resistance, by closing its pores at a certain temperature. It is desirable that the pore size of the separator is in a range where the active material, binder and conductive agent, each of which is occasionally released from the electrode, do not pass therethrough; for example, 0.01 to 1 $\mu$m. Generally, the thickness of the separator is 10 to 300 $\mu$m. The porosity of the separator is generally 30 to 80%.

The positive electrode mixture and negative electrode mixture may contain a gel comprising a polymer material and a liquid non-aqueous electrolyte retained therein. It is also possible to configure a battery comprising a positive electrode, a negative electrode and a porous separator comprising such gel integrated therewith. As the above-described polymer material, for example, a copolymer of vinylidene fluoride and hexafluoropropylene is preferable.

Next, the present invention is concretely described with reference to examples. Herein, descriptions are made for square batteries; however, the shape of the battery is not limited thereto. The present invention is also applicable to batteries of coin-type, button-type, sheet-type, laminated-type, cylindrical-type and flat-type. The present invention is also applicable to large batteries for use in electric vehicles and the like.

EXAMPLE 1

(i) Fabrication of Positive Electrode

A positive electrode active material having the composition formula $(Li_{0.95}Al_{0.05})(Co_{0.9}Al_{0.1})O_2$ was synthesized in the following manner.

An aqueous solution containing cobalt sulfate at a concentration of 0.9 mol/l and aluminium sulfate at a concentration of 0.1 mol/l was prepared. While adding dropwise an aqueous solution of sodium hydroxide such that the pH of the above solution was 10 to 13, the respective materials were continuously supplied to a reaction vessel thereby to synthesize a precursor comprising a hydroxide $(Co_{0.9}Al_{0.1})(OH)_2$.

The obtained precursor, lithium carbonate and aluminium hydroxide were mixed such that the molar ratio of the total amount of cobalt and aluminium in the precursor, the amount of lithium in lithium carbonate and the amount of aluminium in aluminium hydroxide was 1:0.95:0.05. After temporarily baked at 600° C., the mixture was pulverized and subsequently baked again at 900° C., followed by pulverization and classification, thereby producing a positive electrode active material. It should be noted that the baking was performed in air for 10 hours each time.

100 parts by weight of the obtained positive electrode active material, 3 parts by weight of acetylene black as a conductive agent and 7 parts by weight of polytetrafluoroethylene as a binder were mixed, followed by further adding thereto 100 parts by weight of an aqueous solution of carboxymethyl cellulose having a concentration of 1 wt %, and the whole was mixed and stirred to produce a pasty positive electrode mixture.

This positive electrode mixture was applied onto both sides of a current collector of aluminium foil having a thickness of 20 $\mu$m, which was dried, then rolled and cut into a predetermined size to produce a positive electrode.

(ii) Fabrication of Negative Electrode 100 parts by weight of flake graphite, pulverized and classified to have a mean particle diameter of about 20 $\mu$m, was mixed with 3 parts by weight of styrenebutadiene rubber as a binder, followed by further adding thereto 100 parts by weight of an aqueous solution of carboxymethyl cellulose having a concentration of 1 wt %, and the whole was mixed and stirred to produce a pasty negative electrode mixture.

This negative electrode mixture was applied onto both sides of a current collector of copper foil having a thickness of 15 $\mu$m, which was dried, then rolled and cut into a predetermined size to produce a negative electrode.

(iii) Fabrication of Battery

FIG. 1 shows a partially cutaway oblique view of a square non-aqueous electrolyte secondary battery (width 34 mm, height 50 mm) fabricated in this example. As shown in the FIGURE, the above-described positive electrode and negative electrode were spirally wound, with a separator disposed therebetween, to form an electrode plate assembly 1. One end of a positive electrode lead 2 made of aluminium and one end of a negative electrode lead 3 made of nickel were welded to the positive electrode and negative electrode, respectively. An insulating ring made of polyethylene resin was mounted on an upper side of the electrode plate assembly 1, and the whole was placed in a battery case 4 made of aluminium. It should be noted that the insulating ring is not shown in the FIGURE. The other end of the positive electrode lead 2 was spot-welded to a sealing plate 5 made of aluminum, and the other end of the negative electrode lead 3 was spot-welded to a negative electrode terminal 6 made of nickel located at the center of the sealing plate 5. The opening end of the battery case 4 was laser-welded with the sealing plate 5, and a predetermined amount of a non-aqueous electrolyte was injected from an inlet into the battery. Finally, the inlet was closed with a sealing stopper 7 made of aluminium, followed by laser-welding, thereby completing a battery.

Herein, a microporous polyethylene film having a thickness of 25 $\mu$m was used as the separator. Further, a mixed solvent of ethylene carbonate and ethyl methyl carbonate at a volume ratio of 1:3 with LiPF$_6$ dissolved therein at a concentration of 1.0 mol/l, was used as the non-aqueous electrolyte.

The battery thus fabricated was named Battery 1A of the present invention.

EXAMPLE 2

A precursor comprising a hydroxide $(Co_{0.9}Cu_{0.1})(OH)_2$ was synthesized in the same manner as in Example 1 except for the use of copper sulfate in place of aluminium sulfate.

Further, the precursor was used to produce a positive electrode active material $(Li_{0.95}Cu_{0.05})(Co_{0.9}Cu_{0.1})O_2$ in the same manner as in Example 1 except for the use of copper carbonate in place of aluminium hydroxide, and this was used to fabricate Battery 2A similar to Battery 1A.

EXAMPLE 3

A precursor comprising a hydroxide $(Co_{0.9}Zn_{0.1})(OH)_2$ was synthesized in the same manner as in Example 1 except for the use of zinc sulfate in place of aluminium sulfate.

Further, the precursor was used to produce a positive electrode active material $(Li_{0.95}Zn_{0.5})(Co_{0.9}Zn_{0.1})O_2$ in the same manner as in Example 1 except for the use of zinc oxide in place of aluminium hydroxide, and this was used to fabricate Battery 3A similar to Battery 1A.

EXAMPLE 4

A precursor comprising a hydroxide $(Co_{0.9}Mg_{0.1})(OH)_2$ was synthesized in the same manner as in Example 1 except for the use of magnesium sulfate in place of aluminium sulfate.

Further, the precursor was used to produce a positive electrode active material $(Li_{0.95}Mg_{0.05})(Co_{0.9}Mg_{0.1})O_2$ in the same manner as in Example 1 except for the use of basic magnesium carbonate in place of aluminium hydroxide, and this was used to fabricate Battery 4A similar to Battery 1A.

EXAMPLE 5

A precursor comprising a hydroxide $(Co_{0.9}Ca_{0.1})(OH)_2$ was synthesized in the same manner as in Example 1 except for the use of calcium sulfate in place of aluminium sulfate.

Further, the precursor was used to produce a positive electrode active material $(Li_{0.95}Ca_{0.05})(Co_{0.9}Ca_{0.1})O_2$ in the same manner as in Example 1 except for the use of calcium carbonate in place of aluminium hydroxide, and this was used to fabricate Battery 5A similar to Battery 1A.

EXAMPLE 6

A precursor comprising a hydroxide $(Co_{0.9}Ba_{0.1})(OH)_2$ was synthesized in the same manner as in Example 1 except for the use of barium sulfate in place of aluminium sulfate.

Further, the precursor was used to produce a positive electrode active material $(Li_{0.95}Ba_{0.05})(Co_{0.9}Ba_{0.1})O_2$ in the same manner as in Example 1 except for the use of barium carbonate in place of aluminium hydroxide, and this was used to fabricate Battery 6A similar to Battery 1A.

EXAMPLE 7

A precursor comprising a hydroxide $(Co_{0.9}Sr_{0.1})(OH)_2$ was synthesized in the same manner as in Example 1 except for the use of strontium sulfate in place of aluminium sulfate.

Further, the precursor was used to produce a positive electrode active material $(Li_{0.95}Sr_{0.05})(Co_{0.9}Sr_{0.1})O_2$ in the same manner as in Example 1 except for the use of strontium carbonate in place of aluminium hydroxide, and this was used to fabricate Battery 7A similar to Battery 1A.

EXAMPLE 8

An aqueous solution containing cobalt sulfate at a concentration of 0.99 mol/l and aluminium sulfate at a concentration of 0.01 mol/l was prepared. While adding dropwise an aqueous solution of sodium hydroxide such that the pH of the above solution was 10 to 13, the respective materials were continuously supplied to a reaction vessel thereby to synthesize a precursor comprising a hydroxide $(Co_{0.99}Al_{0.01})(OH)_2$.

Except that the obtained precursor, lithium carbonate and aluminium hydroxide were mixed such that the molar ratio of the total amount of cobalt and aluminium in the precursor, the amount of lithium in lithium carbonate and the amount of aluminium in aluminium hydroxide was 1:0.99:0.01, a positive electrode active material $(Li_{0.99}Al_{0.01})(Co_{0.99}Al_{0.01})O_2$ was produced in the same manner as in Example 1, and this was used to fabricate Battery 8A similar to Battery 1A.

EXAMPLE 9

A precursor comprising a hydroxide $(Co_{0.99}Cu_{0.01})(OH)_2$ was synthesized in the same manner as in Example 8 except for the use of copper sulfate in place of aluminium sulfate.

Further, the precursor was used to produce a positive electrode active material $(Li_{0.99}Cu_{0.01})(Co_{0.99}Cu_{0.01})O_2$ in the same manner as in Example 8 except for the use of copper carbonate in place of aluminium hydroxide, and this was used to fabricate Battery 9A similar to Battery 1A.

EXAMPLE 10

A precursor comprising a hydroxide $(Co_{0.99}Zn_{0.01})(OH)_2$ was synthesized in the same manner as in Example 8 except for the use of zinc sulfate in place of aluminium sulfate.

Further, the precursor was used to produce a positive electrode active material $(Li_{0.99}Zn_{0.01})(Co_{0.99}Zn_{0.01})O_2$ in the same manner as in Example 8 except for the use of zinc oxide in place of aluminium hydroxide, and this was used to fabricate Battery 10A similar to Battery 1A.

EXAMPLE 11

A precursor comprising a hydroxide $(Co_{0.99}Mg_{0.01})(OH)_2$ was synthesized in the same manner as in Example 8 except for the use of magnesium sulfate in place of aluminium sulfate.

Further, the precursor was used to produce a positive electrode active material $(Li_{0.99}Mg_{0.01})(Co_{0.99}Mg_{0.01})O_2$ in the same manner as in Example 8 except for the use of basic magnesium carbonate in place of aluminium hydroxide, and this was used to fabricate Battery 11A similar to Battery 1A.

EXAMPLE 12

A precursor comprising a hydroxide $(Co_{0.99}Ca_{0.01})(OH)_2$ was synthesized in the same manner as in Example 8 except for the use of calcium sulfate in place of aluminium sulfate.

Further, the precursor was used to produce a positive electrode active material $(Li_{0.99}Ca_{0.01})(Co_{0.99}Ca_{0.01})O_2$ in the same manner as in Example 8 except for the use of calcium carbonate in place of aluminium hydroxide, and this was used to fabricate Battery 12A similar to Battery 1A.

EXAMPLE 13

A precursor comprising a hydroxide $(Co_{0.99}Ba_{0.01})(OH)_2$ was synthesized in the same manner as in Example 8 except for the use of barium sulfate in place of aluminium sulfate.

Further, the precursor was used to produce a positive electrode active material $(Li_{0.99}Ba_{0.01})(Co_{0.99}Ba_{0.01})O_2$ in the same manner as in Example 8 except for the use of barium carbonate in place of aluminium hydroxide, and this was used to fabricate Battery 13A similar to Battery 1A.

EXAMPLE 14

A precursor comprising a hydroxide $(Co_{0.99}Sr_{0.01})(OH)_2$ was synthesized in the same manner as in Example 8 except for the use of strontium sulfate in place of aluminium sulfate.

Further, the precursor was used to produce a positive electrode active material $(Li_{0.99}Sr_{0.01})(Co_{0.99}Sr_{0.01})O_2$ in the same manner as in Example 8 except for the use of strontium carbonate in place of aluminium hydroxide, and this was used to fabricate Battery 14A similar to Battery 1A.

EXAMPLE 15

An aqueous solution containing cobalt sulfate at a concentration of 0.95 mol/l and aluminium sulfate at a concentration of 0.05 mol/l was prepared. While adding dropwise an aqueous solution of sodium hydroxide such that the pH of the above aqueous solution was 10 to 13, the respective materials were continuously supplied to a reaction vessel thereby to synthesize a precursor comprising a hydroxide $(Co_{0.95}Al_{0.05})(OH)_2$.

Except that the obtained precursor, lithium carbonate and aluminium hydroxide were mixed such that the molar ratio of the total amount of cobalt and aluminium in the precursor, the amount of lithium in lithium carbonate and the amount of aluminium in aluminium hydroxide was 1:0.97:0.03, a positive electrode active material $(Li_{0.97}Al_{0.03})(Co_{0.95}Al_{0.05})O_2$ was produced in the same manner as in Example 1, and this was used to fabricate Battery 15A similar to Battery 1A.

EXAMPLE 16

A precursor comprising a hydroxide $(Co_{0.95}Cu_{0.05})(OH)_2$ was synthesized in the same manner as in Example 15 except for the use of copper sulfate in place of aluminium sulfate.

Further, the precursor was used to produce a positive electrode active material $(Li_{0.97}Cu_{0.03})(Co_{0.95}Cu_{0.05})O_2$ in the same manner as in Example 15 except for the use of copper carbonate in place of aluminium hydroxide, and this was used to fabricate Battery 16A similar to Battery 1A.

EXAMPLE 17

A precursor comprising a hydroxide $(Co_{0.95}Zn_{0.05})(OH)_2$ was synthesized in the same manner as in Example 15 except for the use of zinc sulfate in place of aluminium sulfate.

Further, the precursor was used to produce a positive electrode active material $(Li_{0.97}Zn_{0.03})(Co_{0.95}Zn_{0.05})O_2$ in the same manner as in Example 15 except for the use of zinc oxide in place of aluminium hydroxide, and this was used to fabricate Battery 17A similar to Battery 1A.

EXAMPLE 18

A precursor comprising a hydroxide $(Co_{0.95}Mg_{0.05})(OH)_2$ was synthesized in the same manner as in Example 15 except for the use of magnesium sulfate in place of aluminium sulfate.

Further, the precursor was used to produce a positive electrode active material $(Li_{0.97}Mg_{0.03})(Co_{0.95}Mg_{0.05})O_2$ in the same manner as in Example 15 except for the use of basic magnesium carbonate in place of aluminium hydroxide, and this was used to fabricate Battery 18A similar to Battery 1A.

EXAMPLE 19

A precursor comprising a hydroxide $(Co_{0.95}Ca_{0.05})(OH)_2$ was synthesized in the same manner as in Example 15 except for the use of calcium sulfate in place of aluminium sulfate.

Further, the precursor was used to produce a positive electrode active material $(Li_{0.97}Ca_{0.03})(Co_{0.95}Ca_{0.05})O_2$ in the same manner as in Example 15 except for the use of calcium carbonate in place of aluminium hydroxide, and this was used to fabricate Battery 19A similar to Battery 1A.

EXAMPLE 20

A precursor comprising a hydroxide $(Co_{0.95}Ba_{0.05})(OH)_2$ was synthesized in the same manner as in Example 15 except for the use of barium sulfate in place of aluminium sulfate.

Further, the precursor was used to produce a positive electrode active material $(Li_{0.97}Ba_{0.03})(Co_{0.95}Ba_{0.05})O_2$ in the same manner as in Example 15 except for the use of barium carbonate in place of aluminium hydroxide, and this was used to fabricate Battery 20A similar to Battery 1A.

EXAMPLE 21

A precursor comprising a hydroxide $(Co_{0.95}Sr_{0.05})(OH)_2$ was synthesized in the same manner as in Example 15 except for the use of strontium sulfate in place of aluminium sulfate.

Further, the precursor was used to produce a positive electrode active material $(Li_{0.97}Sr_{0.03})(Co_{0.95}Sr_{0.05})O_2$ in the same manner as in Example 15 except for the use of strontium carbonate in place of aluminium hydroxide, and this was used to fabricate Battery 21A similar to Battery 1A.

COMPARATIVE EXAMPLE 1

An aqueous solution containing cobalt sulfate at a concentration of 0.85 mol/l and aluminium sulfate at a concentration of 0.15 mol/l was prepared. While adding dropwise an aqueous solution of sodium hydroxide such that the pH of the above aqueous solution was 10 to 13, the respective materials were continuously supplied to a reaction vessel thereby to synthesize a precursor comprising a hydroxide $(Co_{0.85}Al_{0.15})(OH)_2$.

The obtained precursor and lithium carbonate were mixed such that the molar ratio of the total amount of cobalt and aluminium in the precursor and the amount of lithium in lithium carbonate was 1:1. After temporarily baked at 600° C., the mixture was pulverized and subsequently baked again at 900° C., followed by pulverization and classification, thereby producing a positive electrode active material $Li(Co_{0.85}Al_{0.15})O_2$. It should be noted that the baking was performed in air for 10 hours each time.

The resultant positive electrode active material was used to fabricate Battery 1B similar to Battery 1A.

COMPARATIVE EXAMPLE 2

A precursor comprising a hydroxide $(Co_{0.85}Cu_{0.15})(OH)_2$ was synthesized in the same manner as in Comparative Example 1 except for the use of copper sulfate in place of aluminium sulfate.

Further, a positive electrode active material $Li(Co_{0.85}Cu_{0.15})O_2$ was produced in the same manner as in Comparative Example 1 except for the use of the precursor, and this was used to fabricate Battery 2B similar to Battery 1A.

COMPARATIVE EXAMPLE 3

A precursor comprising a hydroxide $(Co_{0.85}Zn_{0.15})(OH)_2$ was synthesized in the same manner as in Comparative Example 1 except for the use of zinc sulfate in place of aluminium sulfate.

Further, a positive electrode active material $Li(Co_{0.85}Zn_{0.15})O_2$ was produced in the same manner as in Comparative Example 1 except for the use of the precursor, and this was used to fabricate Battery 3B similar to Battery 1A.

COMPARATIVE EXAMPLE 4

A precursor comprising a hydroxide $(Co_{0.85}Mg_{0.15})(OH)_2$ was synthesized in the same manner as in Comparative Example 1 except for the use of magnesium sulfate in place of aluminium sulfate.

Further, a positive electrode active material $Li(Co_{0.85}Mg_{0.15})O_2$ was produced in the same manner as in Comparative Example 1 except for the use of the precursor, and this was used to fabricate Battery 4B similar to Battery 1A.

COMPARATIVE EXAMPLE 5

A precursor comprising a hydroxide $(Co_{0.85}Ca_{0.15})(OH)_2$ was synthesized in the same manner as in Comparative Example 1 except for the use of calcium sulfate in place of aluminium sulfate.

Further, a positive electrode active material $Li(Co_{0.85}Ca_{0.15})O_2$ was produced in the same manner as in Comparative Example 1 except for the use of the precursor, and this was used to fabricate Battery 5B similar to Battery 1A.

COMPARATIVE EXAMPLE 6

A precursor comprising a hydroxide $(CO_{0.85}Ba_{0.15})(OH)_2$ was synthesized in the same manner as in Comparative Example 1 except for the use of barium sulfate in place of aluminium sulfate.

Further, a positive electrode active material $Li(Co_{0.85}Ba_{0.15})O_2$ was produced in the same manner as in Comparative Example 1 except for the use of the precursor, and this was used to fabricate Battery 6B similar to Battery 1A.

COMPARATIVE EXAMPLE 7

A precursor comprising a hydroxide $(CO_{0.85}Sr_{0.15})(OH)_2$ was synthesized in the same manner as in Comparative Example 1 except for the use of strontium sulfate in place of aluminium sulfate.

Further, a positive electrode active material $Li(Co_{0.85}Sr_{0.15})O_2$ was produced in the same manner as in Comparative Example 1 except for the use of the precursor, and this was used to fabricate Battery 7B similar to Battery 1A.

COMPARATIVE EXAMPLE 8

An aqueous solution of cobalt sulfate was prepared. While adding dropwise an aqueous solution of sodium hydroxide such that the pH of the above aqueous solution was 10 to 13, the materials were continuously supplied to a reaction vessel thereby to synthesize a precursor comprising cobalt hydroxide.

The obtained precursor, lithium carbonate and aluminium sulfate were mixed such that the molar ratio of the amount of cobalt in the precursor, the amount of lithium in lithium carbonate and the amount of aluminium in aluminium sulfate was 1:0.85:0.15. After temporarily baked at 600° C., the mixture was pulverized and subsequently baked again at 900° C., followed by pulverization and classification, thereby producing a positive electrode active material $(Li_{0.85}Al_{0.15})CoO_2$. It should be noted that the baking was performed in air for 10 hours each time.

The resultant positive electrode active material was used to fabricate Battery 8B similar to Battery 1A.

COMPARATIVE EXAMPLE 9

A positive electrode active material $(Li_{0.85}Cu_{0.15})CoO_2$ was produced in the same manner as in Comparative Example 8 except for the use of copper sulfate in place of aluminium hydroxide, and this was used to fabricate Battery 9B similar to Battery 1A.

COMPARATIVE EXAMPLE 10

A positive electrode active material $(Li_{0.85}Zn_{0.15})CoO_2$ was produced in the same manner as in Comparative Example 8 except for the use of zinc sulfate in place of aluminium hydroxide, and this was used to fabricate Battery 10B similar to Battery 1A.

COMPARATIVE EXAMPLE 11

A positive electrode active material $(Li_{0.85}Mg_{0.15})CoO_2$ was produced in the same manner as in Comparative Example 8 except for the use of magnesium sulfate in place of aluminium hydroxide, and this was used to fabricate Battery 11B similar to Battery 1A.

COMPARATIVE EXAMPLE 12

A positive electrode active material $(Li_{0.85}Ca_{0.15})CoO_2$ was produced in the same manner as in Comparative Example 8 except for the use of calcium sulfate in place of aluminium hydroxide, and this was used to fabricate Battery 12B similar to Battery 1A.

COMPARATIVE EXAMPLE 13

A positive electrode active material $(Li_{0.85}Ba_{0.15})CoO_2$ was produced in the same manner as in Comparative Example 8 except for the use of barium sulfate in place of aluminium hydroxide, and this was used to fabricate Battery 13B similar to Battery 1A.

COMPARATIVE EXAMPLE 14

A positive electrode active material $(Li_{0.85}Sr_{0.15})CoO_2$ was produced in the same manner as in Comparative Example 8 except for the use of strontium sulfate in place of aluminium hydroxide, and this was used to fabricate Battery 14B similar to Battery 1A.

COMPARATIVE EXAMPLE 15

Lithium carbonate and cobalt hydroxide were mixed such that the numbers of moles of lithium and cobalt were equal to synthesize a positive electrode active material $LiCoO_2$ under the same conditions as in Example 1, and this was used to fabricate Battery 15B similar to Battery 1A.

[Evaluation of Batteries]

Batteries 1A to 21A of the examples of the present invention and Batteries 1B to 15B of the comparative examples were subjected to charge/discharge cycles at an ambient temperature of 20° C. In charging, a constant voltage charge was performed for two hours with a maximum current of 600 mA and an end of charge voltage of 4.2 V. Discharge was performed at a constant current of 600 mA and an end of discharge voltage of 3.0 V.

The ratio of the battery capacity after 300 cycles to the battery capacity at 1st cycle was calculated as a capacity retention rate in percentage. In addition, the increase in battery thickness occurred after charge/discharge cycles was measured. The results are shown in Table 1.

TABLE 1

| Battery | Element added | Composition of positive electrode active material | Capacity retention rate [%] | Thickness increase [mm] |
|---|---|---|---|---|
| 1A | Al | $(Li_{0.95}Al_{0.05})(Co_{0.9}Al_{0.1})O_2$ | 92 | 0.010 |
| 2A | Cu | $(Li_{0.95}Cu_{0.05})(Co_{0.9}Cu_{0.1})O_2$ | 92 | 0.008 |
| 3A | Zn | $(Li_{0.95}Zn_{0.05})(Co_{0.9}Zn_{0.1})O_2$ | 90 | 0.013 |
| 4A | Mg | $(Li_{0.95}Mg_{0.05})(Co_{0.9}Mg_{0.1})O_2$ | 91 | 0.006 |
| 5A | Ca | $(Li_{0.95}Ca_{0.05})(Co_{0.9}Ca_{0.1})O_2$ | 92 | 0.017 |
| 6A | Ba | $(Li_{0.95}Ba_{0.05})(Co_{0.9}Ba_{0.1})O_2$ | 89 | 0.017 |
| 7A | Sr | $(Li_{0.95}Sr_{0.05})(Co_{0.9}Sr_{0.1})O_2$ | 92 | 0.015 |
| 8A | Al | $(Li_{0.99}Al_{0.01})(Co_{0.99}Al_{0.01})O_2$ | 90 | 0.062 |
| 9A | Cu | $(Li_{0.99}Cu_{0.01})(Co_{0.99}Cu_{0.01})O_2$ | 89 | 0.058 |
| 10A | Zn | $(Li_{0.99}Zn_{0.01})(Co_{0.99}Zn_{0.01})O_2$ | 88 | 0.062 |
| 11A | Mg | $(Li_{0.99}Mg_{0.01})(Co_{0.99}Mg_{0.01})O_2$ | 89 | 0.055 |
| 12A | Ca | $(Li_{0.99}Ca_{0.01})(Co_{0.99}Ca_{0.01})O_2$ | 88 | 0.069 |
| 13A | Ba | $(Li_{0.99}Ba_{0.01})(Co_{0.99}Ba_{0.01})O_2$ | 88 | 0.070 |
| 14A | Sr | $(Li_{0.99}Sr_{0.01})(Co_{0.99}Sr_{0.01})O_2$ | 90 | 0.060 |
| 15A | Al | $(Li_{0.97}Al_{0.03})(Co_{0.95}Al_{0.05})O_2$ | 91 | 0.030 |
| 16A | Cu | $(Li_{0.97}Cu_{0.03})(Co_{0.95}Cu_{0.05})O_2$ | 91 | 0.029 |
| 17A | Zn | $(Li_{0.97}Zn_{0.03})(Co_{0.95}Zn_{0.05})O_2$ | 89 | 0.032 |
| 18A | Mg | $(Li_{0.97}Mg_{0.03})(Co_{0.95}Mg_{0.05})O_2$ | 90 | 0.025 |
| 19A | Ca | $(Li_{0.97}Ca_{0.03})(Co_{0.95}Ca_{0.05})O_2$ | 90 | 0.038 |
| 20A | Ba | $(Li_{0.97}Ba_{0.03})(Co_{0.95}Ba_{0.05})O_2$ | 89 | 0.038 |
| 21A | Sr | $(Li_{0.97}Sr_{0.03})(Co_{0.95}Sr_{0.05})O_2$ | 91 | 0.037 |
| 1B | Al | $Li(Co_{0.85}Al_{0.15})O_2$ | 82 | 0.22 |
| 2B | Cu | $Li(Co_{0.85}Cu_{0.15})O_2$ | 80 | 0.20 |
| 3B | Zn | $Li(Co_{0.85}Zn_{0.15})O_2$ | 78 | 0.25 |
| 4B | Mg | $Li(Co_{0.85}Mg_{0.15})O_2$ | 80 | 0.19 |
| 5B | Ca | $Li(Co_{0.85}Ca_{0.15})O_2$ | 81 | 0.27 |
| 6B | Ba | $Li(Co_{0.85}Ba_{0.15})O_2$ | 79 | 0.26 |
| 7B | Sr | $Li(Co_{0.85}Sr_{0.15})O_2$ | 82 | 0.22 |
| 8B | Al | $Li(Co_{0.85}Al_{0.15})CoO_2$ | 84 | 0.19 |
| 9B | Cu | $Li(Co_{0.85}Cu_{0.15})CoO_2$ | 81 | 0.17 |
| 10B | Zn | $Li(Co_{0.85}Zn_{0.15})CoO_2$ | 80 | 0.21 |
| 11B | Mg | $Li(Co_{0.85}Mg_{0.15})CoO_2$ | 82 | 0.23 |
| 12B | Ca | $Li(Co_{0.85}Ca_{0.15})CoO_2$ | 82 | 0.24 |
| 13B | Ba | $Li(Co_{0.85}Ba_{0.15})CoO_2$ | 81 | 0.25 |
| 14B | Sr | $Li(Co_{0.85}Sr_{0.15})CoO_2$ | 84 | 0.18 |
| 15B | None | $LiCoO_2$ | 74 | 0.32 |

Comparison between Batteries 1B to 7B and Battery 15B as well as comparison between Batteries 8B to 14B and Battery 15 show that partly replacing either one of lithium and cobalt in LiCoO$_2$ with a different element improved, to some extent, the capacity retention rate and suppressed an increase in battery thickness.

Comparison between Batteries 1A to 21A and Batteries 1B to 14B demonstrates that partly replacing both of lithium and cobalt in LiCoO$_2$ with a different element was more effective than partly replacing one of them with the same.

Comparison between Batteries 8A to 14A and Batteries 1B to 14B demonstrates that partly replacing both of lithium and cobalt with a small amount of a different element was more effective than partly replacing one of them with a large amount of the same.

Moreover, as compared with the batteries of the comparative examples, the batteries employing the positive electrode active materials of the present invention exhibited a greater improvement in temperature rising test and reliability test at high temperatures, each using the batteries in a charged state and those subjected to charge/discharge cycles, so that they had higher reliability under abnormal conditions.

INDUSTRIAL APPLICABILITY

According to the present invention, it is possible to provide a positive electrode active material capable of yielding a non-aqueous electrolyte secondary battery with improved thermal stability of which increase in thickness and decrease in discharge capacity due to repeated charge/discharge cycles are suppressed.

What is claimed is:

1. A positive electrode active material for a non-aqueous electrolyte secondary battery, comprising a composite oxide represented by the general formula (1):

$$(Li_{1-x}M_x)_a(CO_{1-y}M_y)_bO_c \quad (1)$$

where lithium and cobalt are partly replaced with element M in a crystal structure of LiCoO$_c$, wherein element M is at least one selected from the group consisting of Al, Cu, Zn, Mg, Ca, Ba and Sr, and 0.02≦x+y≦0.15, 0.90≦a/b≦1.10, 1.8≦c≦2.2, and x≠0 and y≠0 are satisfied.

2. The positive electrode active material for a non-aqueous electrolyte secondary battery in accordance with claim 1, wherein said composite oxide has an α-NaFeO$_2$ type layer structure belonging to space group R3-m.

3. The positive electrode active material for a non-aqueous electrolyte secondary battery in accordance with claim 1, wherein said composite oxide has a mean particle diameter of 5 to 20 μm.

4. The positive electrode active material for a non-aqueous electrolyte secondary battery in accordance with claim 1, wherein said composite oxide has a specific surface area of 0.3 to 1.2 m$^2$/g.

5. A non-aqueous electrolyte secondary battery comprising:
a positive electrode comprising the positive electrode active material in accordance with claim 1;
a negative electrode comprising metallic lithium or a material capable of absorbing and desorbing lithium; and
a non-aqueous electrolyte.

6. A non-aqueous electrolyte secondary battery comprising:
a positive electrode comprising the positive electrode active material in accordance with claim 2;
a negative electrode comprising metallic lithium or a material capable of absorbing and desorbing lithium; and
a non-aqueous electrolyte.

7. A non-aqueous electrolyte secondary battery comprising:
a positive electrode comprising the positive electrode active material in accordance with claim 3;
a negative electrode comprising metallic lithium or a material capable of absorbing and desorbing lithium; and
a non-aqueous electrolyte.

8. A non-aqueous electrolyte secondary battery comprising:
a positive electrode comprising the positive electrode active material in accordance with claim 4;
a negative electrode comprising metallic lithium or a material capable of absorbing and desorbing lithium; and
a non-aqueous electrolyte.

* * * * *